United States Patent
Schulz et al.

[11] Patent Number: 5,803,533
[45] Date of Patent: Sep. 8, 1998

[54] MOTOR VEHICLE BODY, PARTICULARLY FOR A CONVERTIBLE

[75] Inventors: Robert Schulz, Osnabrueck; Winfried Bunsmann, Bissendorf, both of Germany

[73] Assignee: Wilhelm Karmann GmbH, Osnabrueck, Germany

[21] Appl. No.: 760,538

[22] Filed: Dec. 5, 1996

[30] Foreign Application Priority Data

Dec. 20, 1995 [DE] Germany ............ 295 20 166.5

[51] Int. Cl.⁶ .................................................. B60J 7/00
[52] U.S. Cl. .................................................. 296/204
[58] Field of Search ................... 296/30, 188, 204

[56] References Cited

U.S. PATENT DOCUMENTS 5,074,587  12/1991  Schwede et al. .......... 296/204

FOREIGN PATENT DOCUMENTS 6-144300  5/1994  Japan ....................... 296/204

Primary Examiner—Jesus D. Sotelo
Attorney, Agent, or Firm—Jordan and Hamburg

[57] ABSTRACT

A motor vehicle body, particularly for a convertible, is configured as a self-supporting unit, which is provided with a bottom having integrated longitudinal and transverse beams. The bottom of the body has at least one stiffening segment extending substantially parallel to the bottom from its mid-section to the front and/or rear area of the vehicle body.

32 Claims, 8 Drawing Sheets

MOTOR VEHICLE BODY, PARTICULARLY FOR A CONVERTIBLE

BACKGROUND OF THE INVENTION

The invention relates to a motor vehicle body, particularly for a convertible.

Known motor vehicle bodies of this kind, configured as self-supporting unit bodies (DE 39 05 650 C2), have a body bottom, which is provided in the area of the stringers with bars each directed at the center of the vehicle. These supports are single components connected to the bottom so that only a limited stiffening action can be achieved by spot connections to the front and rear areas and the stiffening action is limited to the absorption of torsional vibrations to the stringers.

SUMMARY OF THE INVENTION

The invention is addressed to the problem of creating a motor vehicle body, particularly for a convertible, whose bottom is given a higher resistance to distortion at little expense and permits an increase in body stiffness while at the same time improving stability and safety characteristics.

The configuration of the bottom of the body with the stiffening segment parallel thereto optimizes a sandwich-like body created therewith, from the viewpoint of stresses to be borne in the vicinity of each wheel axle, with the consequence that, with little construction cost, a largely integrated stabilizing and damping surface is formed at a calculated part of the bottom, which in a convertible automobile or other open-body vehicle of self-supporting design, is exposed to particularly great stresses.

In an expedient embodiment, the stiffening segment in this compound design can be established by bolted joints so that a surface contour defined by the junction points acts as an area of elevated resistance to deformation. It is also conceivable to produce a stable assembly by welding and spot-welding and thus improve the stability or to integrate the stiffening segment completely as an assembly in the particular area of the bottom.

The stiffening segment can be adapted to accommodate different stresses by means of a surface configuration that is variable in design and method of production, for example, by varying the shape in which it is cut, so that the stiffening segment covers a predetermined stiffening area at a low cost of production and assembly, and this area can be defined in different car models by different positions, at which the stiffening segment is installed.

Additional details and advantages will be found in the following description and in the drawings, in which a number of embodiments of the subject matter of the invention are represented schematically in detail.

IN THE DRAWINGS

FIG. 1 shows a perspective view of a motor vehicle body for a convertible motor car, FIG. 2 shows a bottom view of the car body of FIG. 1 representing schematically a stiffening segment in the rear portion of the vehicle, FIG. 3 shows a fragmentary bottom view similar to FIG. 2, with an exploded representation of the stiffening segment, FIG. 4 and FIG. 5 are respectively bottom views showing the stiffening segment in a second embodiment, FIG. 6 and FIG. 7 are respectively bottom views showing the stiffening segment in a third embodiment, and FIG. 8 shows a bottom view similar to FIG. 2, with two stiffening segments.

DESCRIPTION OF THE PREFERRED EMBODIMENTS

Figure 1:
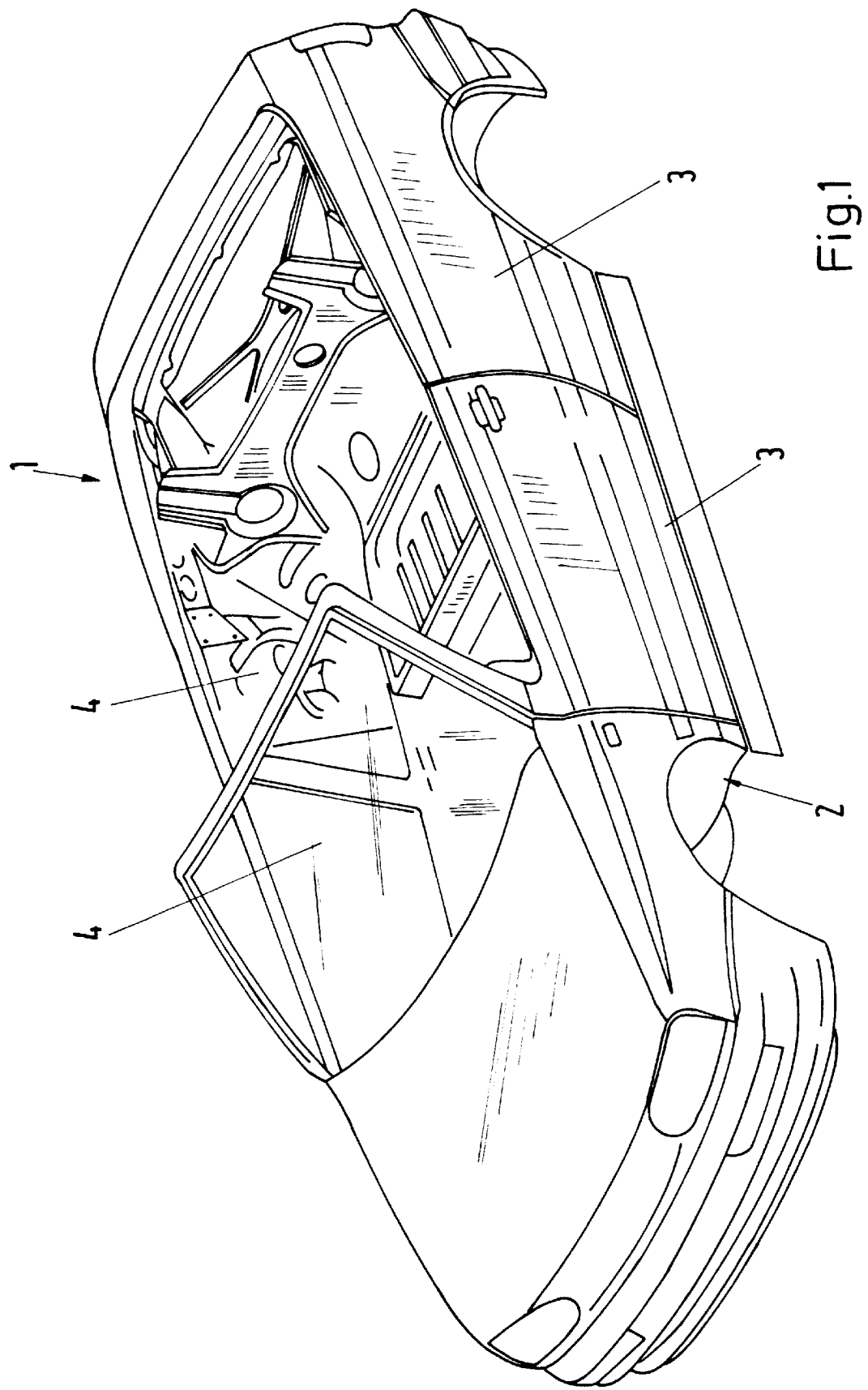

A motor vehicle body for a convertible, generally indicated by 1, is shown in perspective in FIG. 1, this body 1 forming with a body bottom 2 and side parts 3 and 4 indicated thereon a self-supporting unit.

Figure 2:
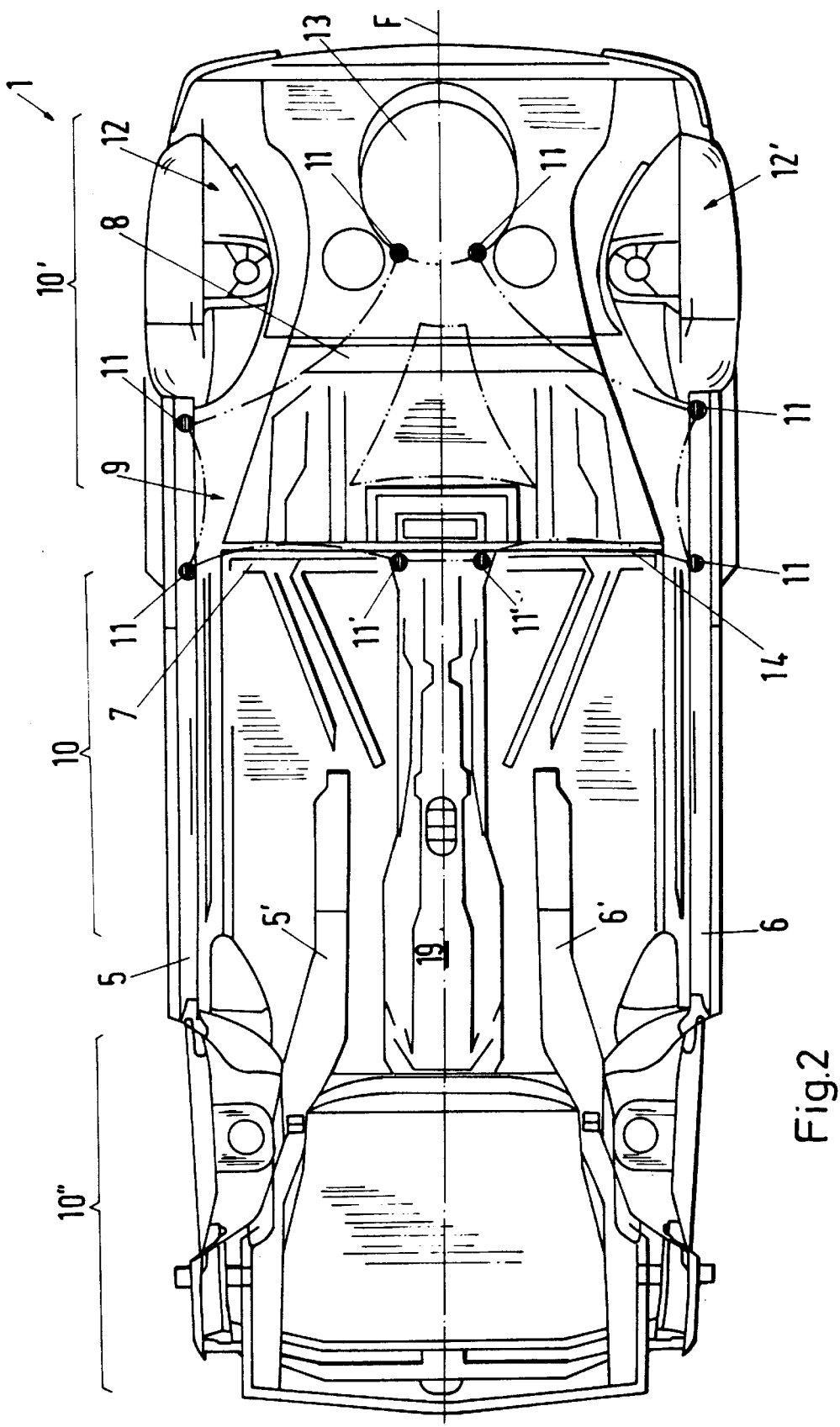

In FIG. 2, a bottom view of the vehicle body 1 shows its substantially integral configuration in the area of the vehicle bottom 2, in the shaping of which the two lateral stringers 5, 6 and 5', 6', as well as transverse portions 7, 8, are integrated.

Pursuant to the invention, the body bottom 2 is provided additionally on its underside with a stiffening segment (FIG. 2) generally indicated at 9 which, in the embodiments represented in FIGS. 2 to 8, is a one-piece component running substantially parallel to the bottom from the middle portion 10 of the bottom 2 to the rear area 10' of the car body. It is also conceivable to join the stiffening segment 9 to the upper side of the car bottom 2 and/or to integrate directly into the latter a stiffening element (not represented) so that only those body areas of the bottom part 2, which are especially heavily stressed in a convertible, will be additionally stiffened with a minimal use of material, in the manner of a sandwich construction.

Figure 8:
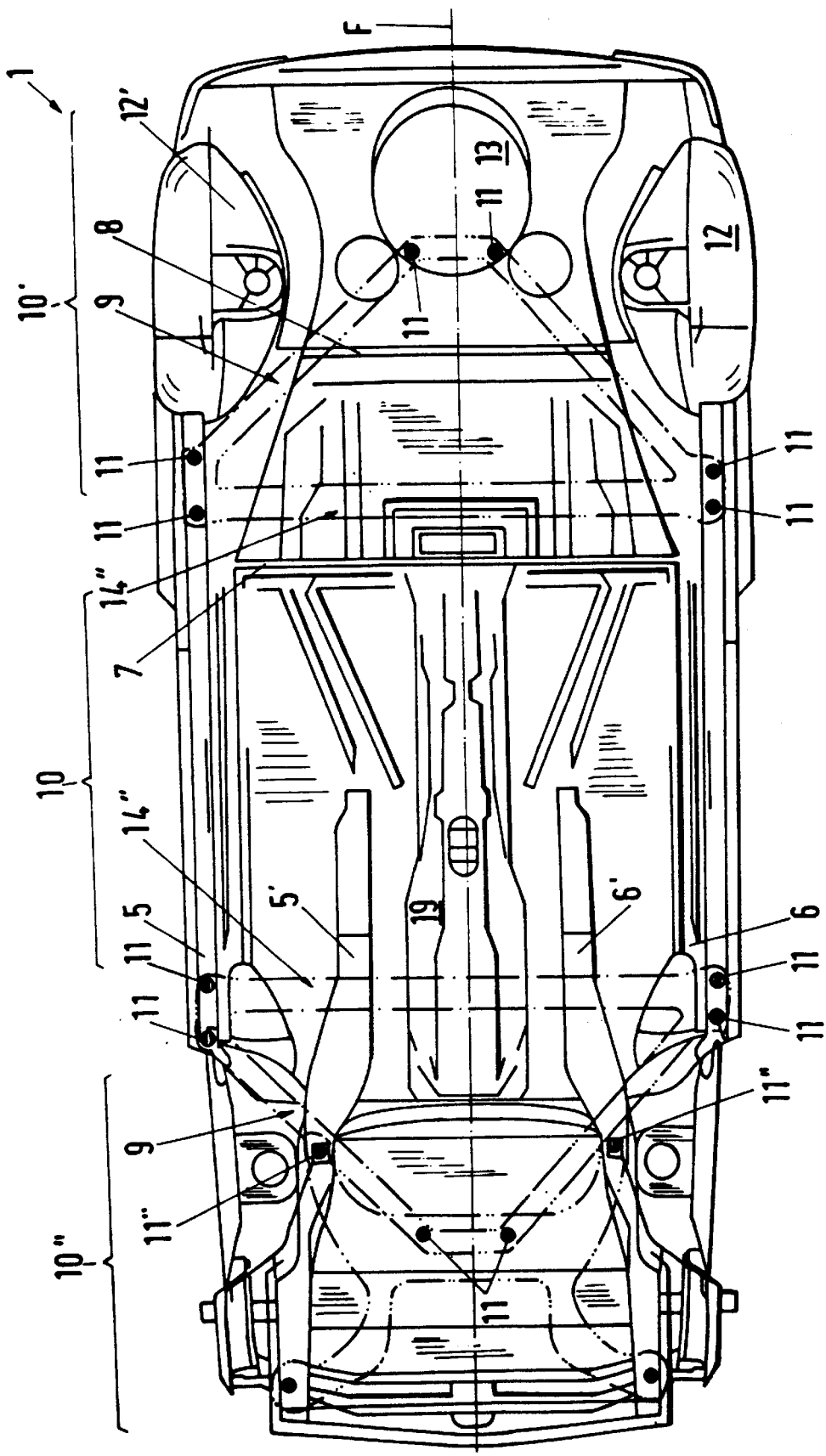

The schematic representation in FIG. 2, of the place where the stiffening element 9 is installed, shows that the stiffening element is affixed to the car bottom 2 at several junctions 11, so that a stabilizing and damping surface, especially a polygonal one, symmetrical with the long axis F of the motor vehicle, is defined and extends from the area in front of the wheel wells 12, 12' to the girder 7 which, in turn, is supported between the stringers 5, 6, where they join the B posts (not shown) of the side parts, 3, 4. Likewise, it is conceivable to widen this polygonal stabilizing and damping surface to the middle part 10 of the body 1 and/or to reinforce the middle and/or front area 10, 10'' of the body 1, together or individually, with at least one additional stiffening segment 9' (FIG. 8).

In the first embodiment (FIG. 2) of the stiffening segment 9 indicated by dash-dotted lines in its installed position, it is joined to the rear area 10' of the bottom 2 of the body at junction points 11 provided on the stringers 5 and 6 and on a recess 13 in the trunk, so that the stabilizing and damping surface is in the form of a convex pentagonal shape with its base line 14 (FIG. 2) running at right angles to the longitudinal axis 12 of the vehicle.

Figure 3:
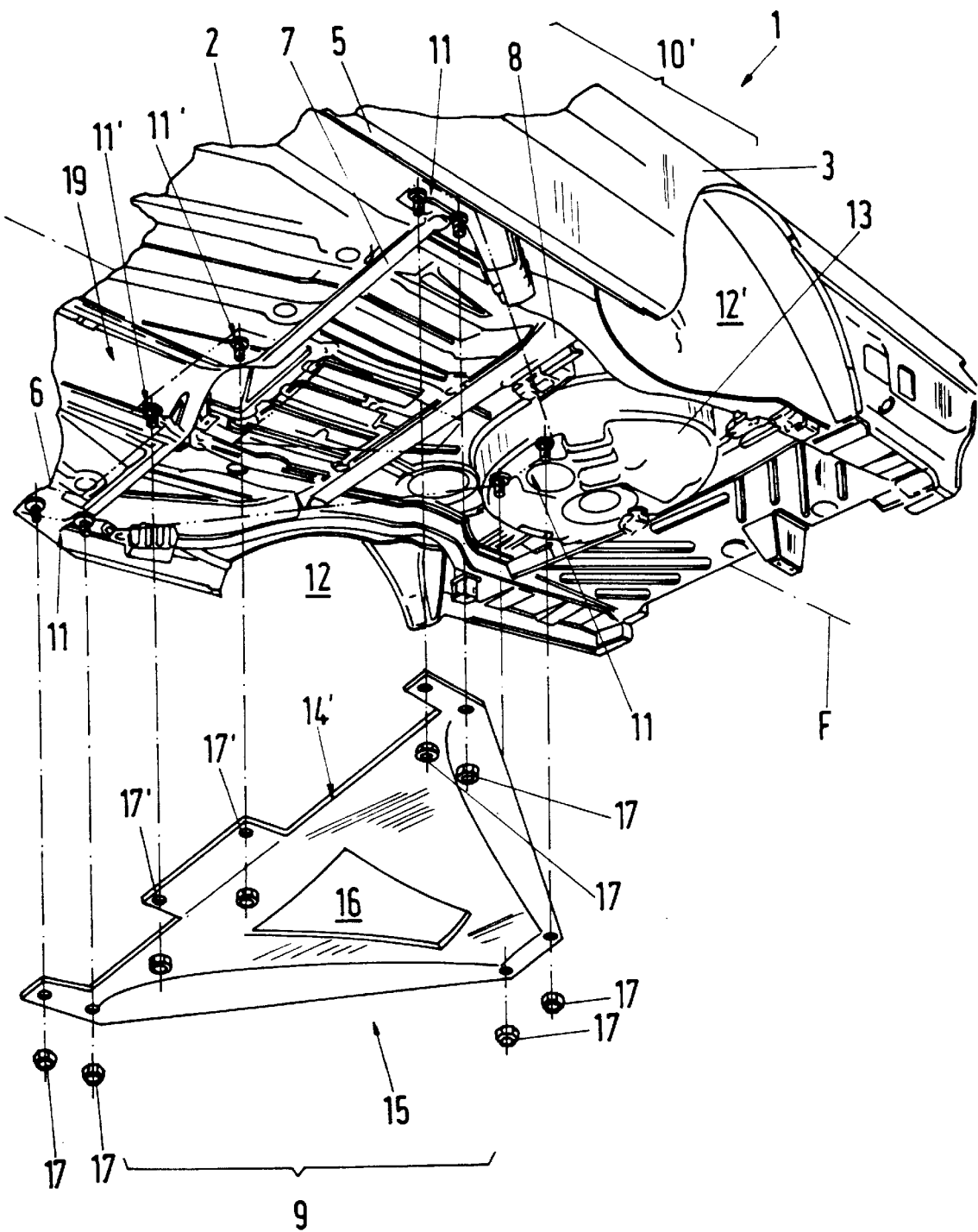

In the exploded view of the installed stiffening segment 9 seen in FIG. 3, its expedient configuration is shown in the form of an equilateral trapezoidal plate 15, at the corners of which junctions 11 are provided, which are constituted by bolts 17 arranged in pairs.

The trapezoidal plate 15 has in its middle area a cutout 16 and, with the junctions 11, the trapezoidal plate 15 undergirds the rear area 10' of the body bottom 2 so that a sandwich structure in the nature of a double bottom is formed. Expediently, the trapezoidal plate 15 is provided at its baseline 14' running transversely across the longitudinal axis F of the vehicle with additional junctions 11', in the area of which a tunnel area 19 formed in the bottom 2 of the body is spanned at its end by the trapezoidal plate, so that this area of the bottom is integrated into the stabilizing and damping surface and an additional stiffening junction is formed, especially toward the middle portion 10.

Figure 4:
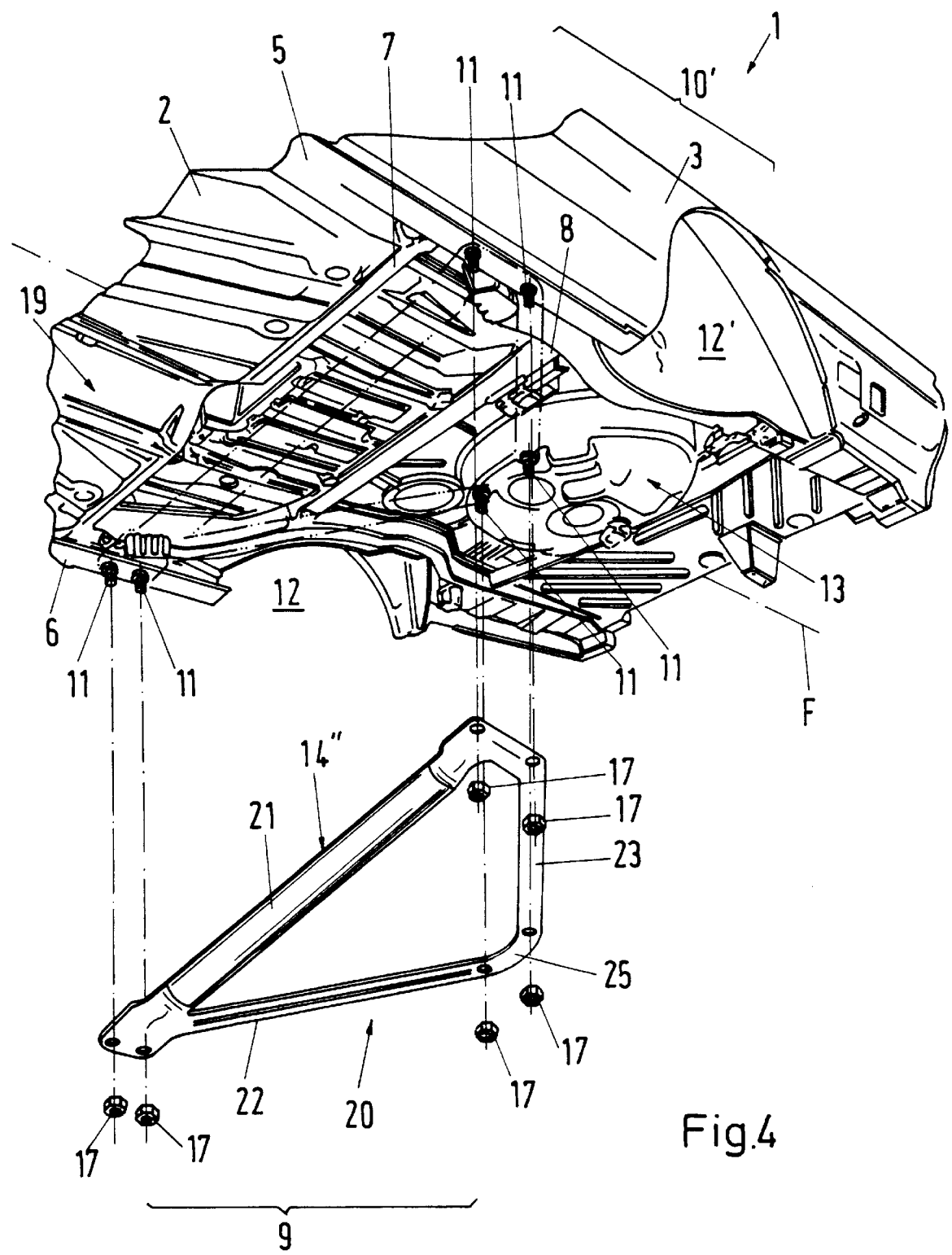
Figure 5:
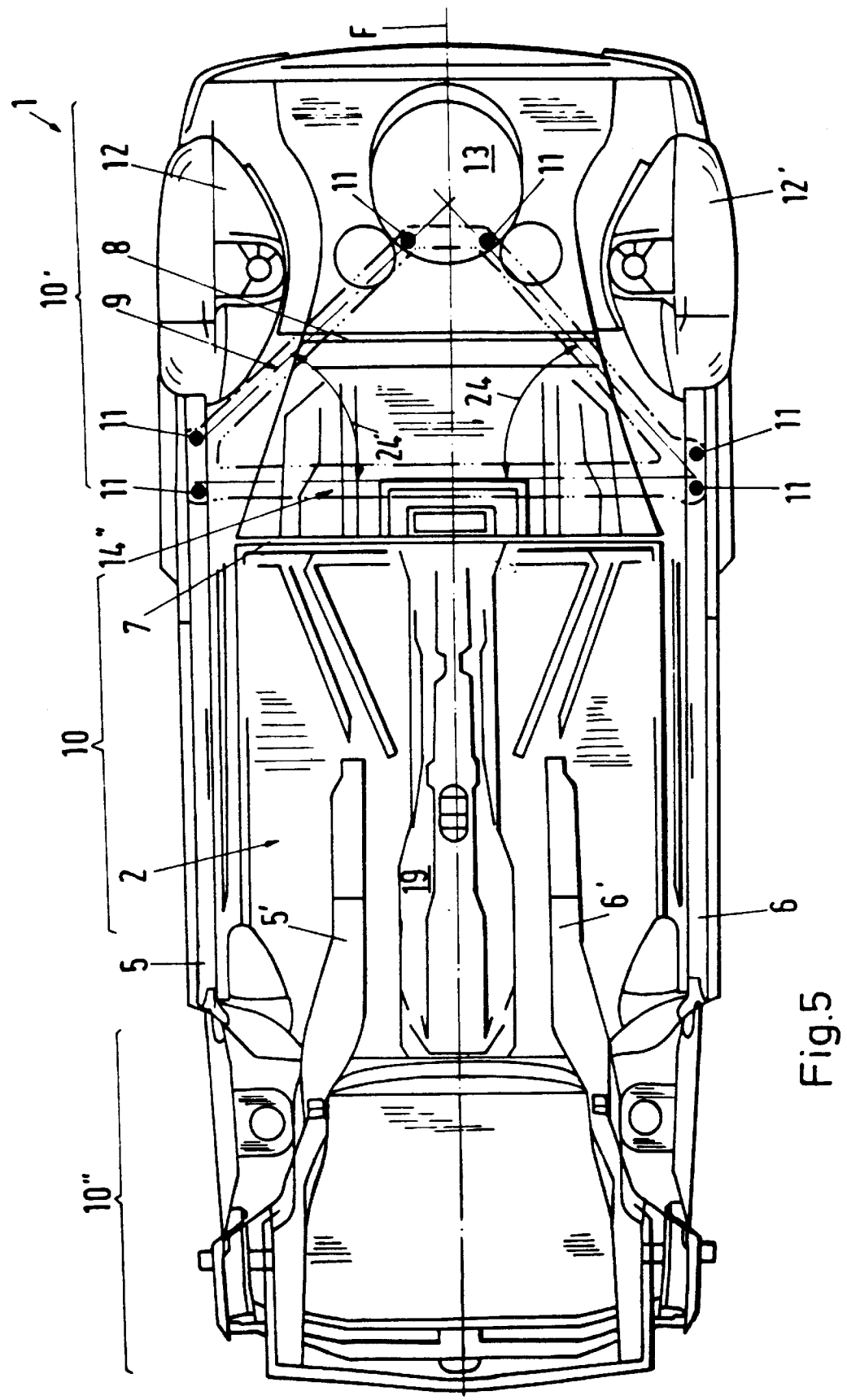
Figure 6:
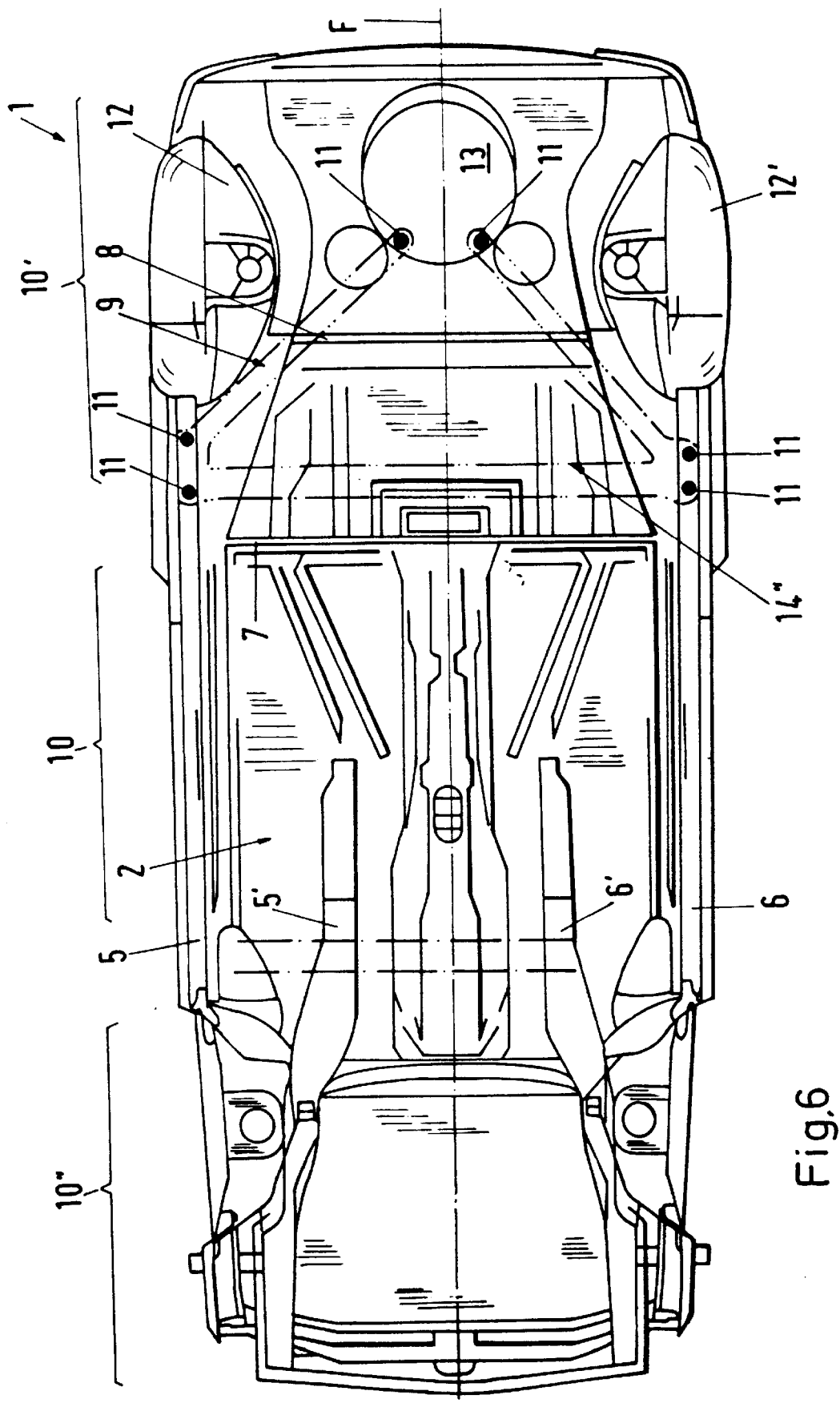
Figure 7:
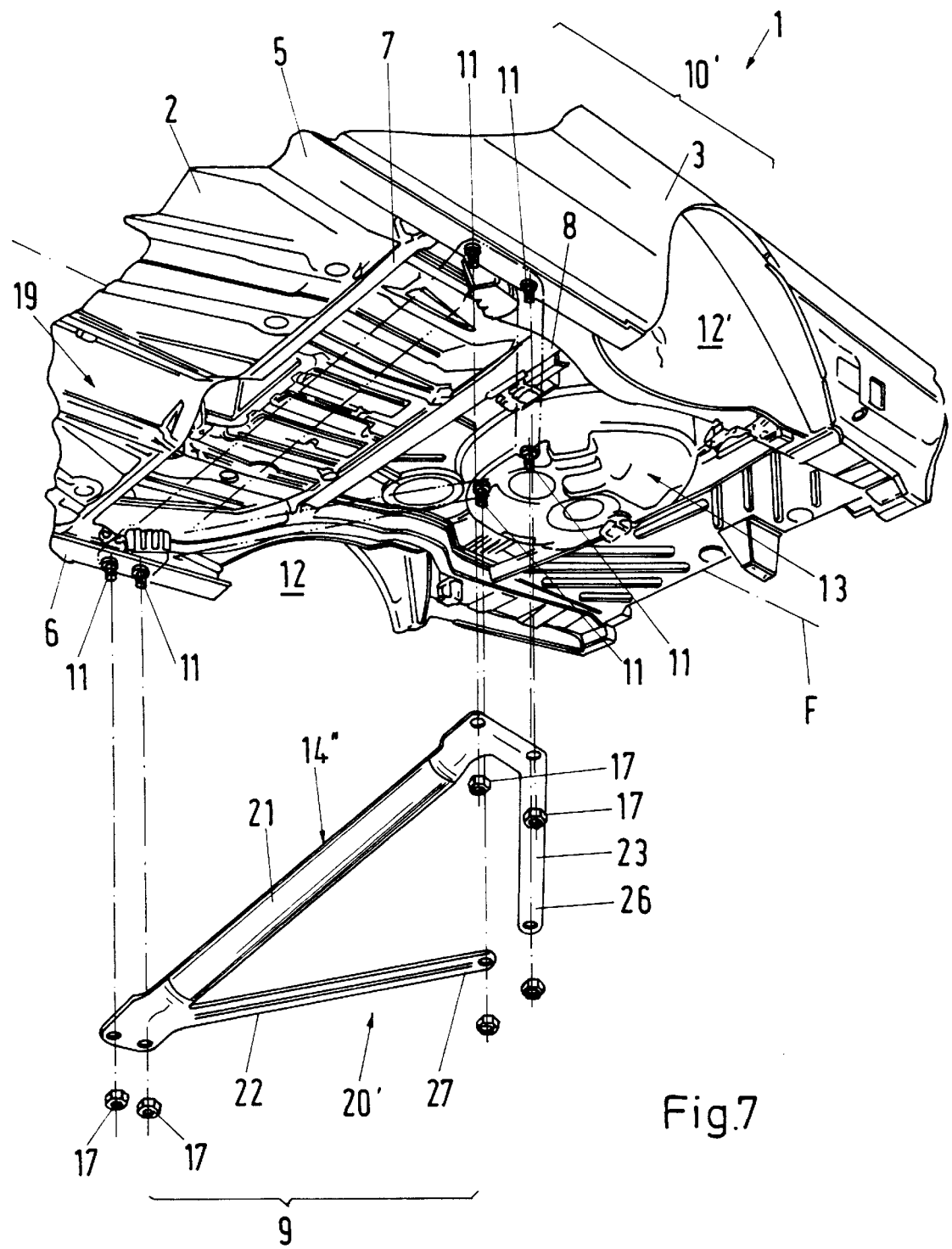

In a second embodiment in FIGS. 4 and 5, the stiffening segment 9 is configured as a coupling 20 having a substantially triangular shape (FIG. 5), whose base 14" running across the long axis F to the two stringers 5, 6 of the bottom 2, is formed by a bar 21, which has leg portions 22, 23 which, on the other hand, form an acute angle (arrow 24) with the long axis 12 and are supported at a common connecting portion 25 on the recess 13.

In an expedient embodiment, the base bar 21 of the coupling 20 can be configured as a tubular bar resistant to torsion and twisting (FIG. 4, FIG. 7), from whose ends the two sides 22 and 23 extend at substantially the same angle (arrow 24, 24' in FIG. 5). In the embodiment according to FIG. 7, the coupling 20' is in the shape of a triangle open at the extremities of the leg portions 22, 23, the ends 26 and 27 of the latter being supported directly on the recess 13 of the bottom 10' at the rear end.

In FIG. 8, another possible inventive application of the stiffening is shown, wherein the bottom of the body 2 is provided with stiffening elements 9, 9' having the same triangular shape, one in the rear area 10' and one in the front area 10". These are preferably in the form of bar connections 20 and in a mirror-image arrangement with respect to the transverse axis, so that the resistance of the body 1 to deformation is adapted to greater stress in the front and rear areas.

What we claim is:

1. A motor vehicle body having a longitudinal axis extending in a direction from a front to a rear of the motor vehicle body, the motor vehicle body comprising:
    a self supporting body unit having a bottom structure with front, middle, and rear portions, the bottom structure including longitudinal side beams extending along opposing sides of at least said middle portion and girders extending transversely to said longitudinal axis and interconnecting said longitudinal side beams;
    at least one stiffening plate extending substantially parallel to said bottom structure, said stiffening plate extending from said middle portion of said self supporting body unit to one of said rear portion and said front portion of said self supporting body unit;
    said stiffening plate having a generally polygonal configuration with a base portion extending generally transverse to said longitudinal axis; and
    connecting means connecting said stiffening plate to said bottom structure including connecting said base portion to said middle portion of said self supporting body at said longitudinal side beams and connecting said stiffening plate to said one of said rear portion and said front portion at an area between wheel wells of said self supporting body unit.

2. The motor vehicle body according to claim 1 wherein said stiffening plate has a cut out middle section.

3. The motor vehicle body according to claim 1 wherein said stiffening plate has convex sides.

4. The motor vehicle body according to claim 1 wherein said stiffening plate has a plurality of sides generally intersecting at a plurality of corner areas, and said connecting means connects said corner areas to said bottom structure.

5. The motor vehicle body according to claim 1 wherein said polygonal configuration is a pentagonal configuration.

6. The motor vehicle body according to claim 5 wherein said stiffening plate has five corner areas, and said connecting means connects said five corner areas to said bottom structure.

7. The motor vehicle body according to claim 1 wherein said stiffening plate has a generally trapezoidal configuration.

8. The motor vehicle body according to claim 7 wherein said stiffening plate has four sides and four corner areas, and said connecting means connects said four corner areas to said bottom structure.

9. The motor vehicle body according to claim 7 wherein said stiffening plate underlies said bottom structure such that said stiffening plate and a portion of said bottom structure overlying said stiffening plate form a double bottom on said self supporting body unit.

10. The motor vehicle body according to claim 7 wherein:
    at least said middle portion of said bottom structure has a tunnel structure provided along said longitudinal axis of said vehicle body;
    said base portion of said stiffening plate has a central portion underlying said tunnel structure; and
    said connecting means connect said base portion of said stiffening plate to said bottom structure at locations juxtaposed to said tunnel structure.

11. A motor vehicle body according to claim 1 wherein said rear portion of said bottom structure has a recessed area, recessed from above and protruding downward, and said connecting means connect said stiffening plate to said recessed area.

12. The motor vehicle body according to claim 11 wherein said rear portion has a rear trunk area and said recessed area is disposed in said trunk area.

13. The motor vehicle body according to claim 12 wherein said recess area is a recess well adapted to receive a spare tire.

14. The motor vehicle body according to claim 1 wherein said connecting means comprises threaded fastening devices.

15. The motor vehicle body according to claim 14 wherein said threaded fastening devices are nuts and bolts.

16. The motor vehicle body according to claim 1 wherein said vehicle body has a vehicle body length, said front portion, said middle portion and said rear portion each extend approximately one-third of said vehicle body length, said stiffening plate extends from said middle portion to underlie said rear portion of said self supporting body unit.

17. The motor vehicle body according to claim 1 wherein said stiffening plate is in a substantially triangular configuration and said base portion forms a base of said substantially triangular configuration.

18. The motor vehicle body according to claim 17 wherein said stiffening plate has side portions extending from said base portion at equal acute angles relative to said base portion and connect to said one of said front portion and said rear portion of said bottom structure.

19. A motor vehicle body having a longitudinal axis extending in a direction from a front to rear of the motor vehicle body, the motor vehicle body comprising:
    a self supporting body unit having a bottom structure with front, middle, and rear portions, the bottom structure including longitudinal side beams extending along opposing sides of at least said middle portion and girders extending transversely to said longitudinal axis and interconnecting said longitudinal side beams;
    at least one stiffening segment extending substantially parallel to said bottom structure, said stiffening segment extending from said middle portion of said self supporting body unit to one of said rear portion and said front portion of said self supporting body unit;
    connecting means connecting said stiffening segment to said middle portion of said self supporting body unit and to said one of said rear portion and said front portion of said self supporting body unit; and said stiffening segment being a bar coupling having bar elements connected in a substantially triangular configuration.

20. The motor vehicle body according to claim 19 wherein said bar elements include a base bar element extending generally transversely of said longitudinal axis and connected to said middle portion of said bottom structure, and two stringer bar elements each extending from said base bar element at equal acute angles relative to said base bar element and connected to said one of said front portion and said rear portion of said bottom structure.

21. The motor vehicle body according to claim 20 wherein said base bar element has end portions, said connecting means connect said end portions to said middle portion of said bottom structure, and said two stringer bar elements extend from said end portions.

22. The motor vehicle body according to claim 21 wherein said end portions of said base bar element are connect to said longitudinal side beams.

23. The motor vehicle body according to claim 20 wherein said bar coupling has a joining section joining said two stringer bar elements, and said connecting means connect said joining section to said one of said front portion and said rear portion of said bottom structure.

24. The motor vehicle body according to claim 20 wherein said stringer bar elements have terminating end portions spaced from one another, and said connecting means connect each of said terminating end portions to said one of said front portion and said rear portion of said bottom structure.

25. The motor vehicle body according to claim 20 wherein said rear portion has a recessed area, recessed from above and protruding downward, said bar coupling having a connecting section joining said two stringer bar elements, and said connecting means connect said connecting section to said recessed area.

26. The motor vehicle body according to claim 25 wherein said recessed area has a bottom and said connecting means connect said connecting section to said bottom of said recess.

27. The motor vehicle body according to claim 20 wherein said base bar element is a substantially tubular member.

28. The motor vehicle body according to claim 27 wherein said two stringer bar elements are substantially flat bars.

29. The motor vehicle body according to claim 19 wherein said vehicle body has a vehicle body length, said front portion, said middle portion and said rear portion each extend approximately one-third of said vehicle body length, said stiffening segment extends from said middle portion to underlie said rear portion of said self supporting body unit.

30. A motor vehicle body having a longitudinal axis extending in a direction from a front to rear of the motor vehicle body, the motor vehicle comprising:

a self supporting body unit having a bottom structure with front, middle, and rear portions, the bottom structure including longitudinal side beams extending along opposing sides of at least said middle portion and girders extending transversely to said longitudinal axis and interconnecting said longitudinal side beams;

at least one stiffening segment extending substantially parallel to said bottom structure, said stiffening segment extending from said middle portion of said body to said rear portion of said vehicle body;

said rear portion of said bottom structure having a recessed area, recessed from above and protruding downward;

connecting means connecting said stiffening segment to said recessed area and said longitudinal side beams at said middle portion;

said rear portion having a rear trunk area and said recessed area being disposed in said trunk area.

31. The motor vehicle body according to claim 30 wherein said recess area is a recess well adapted to receive a spare tire.

32. A motor vehicle body having a longitudinal axis extending in a direction from a front to rear of the motor vehicle body, the motor vehicle body comprising:

a self supporting body unit having a bottom structure with front, middle, and rear portions, the bottom structure including longitudinal side beams extending along opposing sides of at least said middle portion and girders extending transversely to said longitudinal axis and interconnecting said longitudinal side beams;

at least one stiffening segment extending substantially parallel to said bottom structure, said stiffening segment extending from said middle portion of said self supporting body unit to one of said rear portion and said front portion of said self supporting body unit;

connecting means connecting said stiffening segment to said bottom structure including connecting said base portion to said middle portion of said self supporting body at said longitudinal side beams and connecting said stiffening segment to said one of said rear portion and said front portion at an area between wheel wells of said self supporting body unit;

said vehicle body having a vehicle body length, said front portion, said middle portion and said rear portion each extending approximately one-third of said vehicle body length, said stiffening segment extending from said middle portion to underlie said rear portion of said self supporting body unit; and a second stiffening segment extending from said middle portion to said front portion of said self supporting body unit, said second stiffening segment underlying said front portion of said self supporting body unit.

* * * * *